(12) United States Patent
Schimanek

(10) Patent No.: US 6,262,876 B1
(45) Date of Patent: Jul. 17, 2001

(54) CAPACITOR FOR INTERMEDIATE-CIRCUIT ASSEMBLIES OF LOW INDUCTANCE

(75) Inventor: Ernst Schimanek, Nürnberg (DE)

(73) Assignee: Semikron Elektronik GmbH (DE)

( * ) Notice: Subject to any disclaimer, the term of this patent is extended or adjusted under 35 U.S.C. 154(b) by 0 days.

(21) Appl. No.: 09/417,974

(22) Filed: Oct. 13, 1999

(30) Foreign Application Priority Data

Oct. 13, 1998 (DE) .............................. 198 47 028

(51) Int. Cl.⁷ ...................................... H01G 4/32
(52) U.S. Cl. .................. 361/301.5; 361/301.5; 361/313; 361/530
(58) Field of Search .................. 361/301.5, 313, 361/511, 517–519, 530, 535–537

(56) References Cited

U.S. PATENT DOCUMENTS

| | | | | |
|---|---|---|---|---|
| 3,944,895 | * | 3/1976 | Williams | 317/258 |
| 4,307,434 | * | 12/1981 | Holzman | 361/328 |
| 4,308,569 | * | 12/1981 | Rheindorf | 361/275 |
| 4,639,832 | * | 1/1987 | Behn | 361/306 |
| 5,597,992 | * | 1/1997 | Walker | 218/121 |

\* cited by examiner

*Primary Examiner*—Dean A. Reichard
*Assistant Examiner*—Nguyen T Ha
(74) *Attorney, Agent, or Firm*—Morrison Law Firm

(57) ABSTRACT

A contact sleeve passing through a central region of a capacitor provides a low-inductance connection between a lower contact surface of a capacitor and a first outer port. The sleeve is separated from the windings of the capacitor by an insulative layer. A second outer port is formed in close proximity to and insulated from the first outer port so that arcing between the outer ports is prevented. The resulting capacitor has a low inductance and is useful in, for example, the intermediate circuit design of converters, resulting in a compact and reliable configuration.

13 Claims, 4 Drawing Sheets

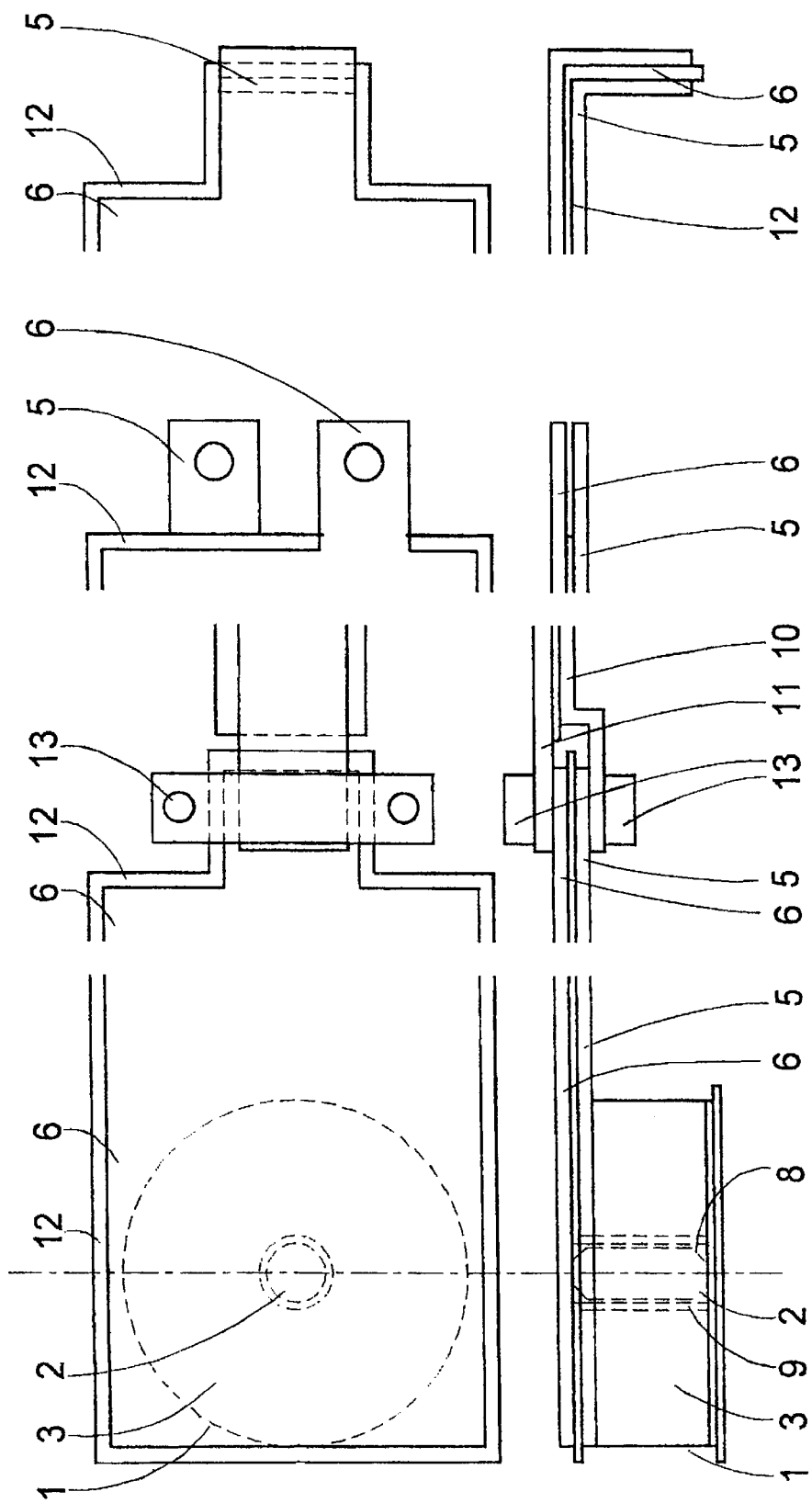

CAPACITOR FOR INTERMEDIATE-CIRCUIT ASSEMBLIES OF LOW INDUCTANCE

BACKGROUND OF THE INVENTION

The present invention relates to a capacitor assembly for sophisticated requirements, providing variants for their application, in particular in converters. The present invention also relates to arrangements of the capacitors according to the present invention integrated in intermediate circuits with low inductance.

Capacitors are sufficiently known in the prior art. Technically, two types of capacitors have become accepted, foil capacitors and electrolytic capacitors. The use of one type of capacitor or the other type of capacitor depends on the requirements in the circuit arrangement. Electrolytic capacitors are limited in their maximum voltage capacity. Presently, conventional electrolytic capacitors have upper voltage limits typically in the range from 450V to 550V. With these conventional capacitors, the highest capacities are achieved. Foil capacitors, on the other hand, have a very low electric charge storage capacity Foil capacitors, can, however, achieve a considerably higher voltage stability, which is an advantage of foil capacitors over electrolytic capacitors.

In power electronics, capacitors are used primarily in intermediate circuits of converters, or as filter capacitors. In both cases, the design of the capacitors must have the lowest possible inductance. Furthermore, each capacitor in the intermediate circuit must have a low-inductance type of port.

In conventional electrolytic capacitors, the connection between the capacitor poles from the aluminum/paper winding and the screw fittings is accomplished by means of several contact tapelets. In capacitors of such design, this type of connection causes a large part of parasitic series inductance, even when the connectors are parallel.

In conventional foil-winding capacitors, a flat round winding is usually made which contact, through soldered plates, to both frontal surfaces. For the connection, the lower plate is led outside the winding area roughly into the plane of the upper plate, which creates the connecting points beside the capacitor.

In other designs, the connection is made in the top surface of the capacitor. Again, the lower plate is bent upward over the capacitor circumference, and the connecting point must then be insulated against its contact surface. In this case, the configuration of the connection causes the greater part of parasitic series inductance. However, for the use in filtering, versions are known which have one connection on the top surface of the capacitor and the other on the bottom surface.

As the power density in modern circuit arrangements increases, the problems of parasitic inductance become more significant, especially in converters with a high switching frequency. Thus, experiments have been published in which all parts carrying DC were positioned so that their two connections are as close as possible to each other.

Several converters of high power density are known from the literature and are cited below as examples to provide insight into the object of the present invention.

In DE 41 10 339 C2, the DC ports of the capacitors are arranged in close proximity to each other, and a flat design of the intermediate circuit is disclosed. The arrangement of the discretely configured capacitors in relation to the intermediate circuit and the switching points of the converter is shown in the figures and described below.

Referring to FIG. 1a, an electrolytic capacitor has a cup 1 with a winding 3 placed therein, although the individual turns are not shown. The contact or connector tapelets 7 are led out of the individual winding segments and bundled into the two DC connections. These bundles are soldered, riveted or welded in a customary, known manner to screw connections 5a and 6a. Screw connections 5a and 6a are mechanically fixed by an insulation plate 4. The unused core in the center of cup 1 is sketched with broken lines in the form of a sleeve 2.

Referring to FIG. 1b, the shape of winding 3 of a foil capacitor is shown. The circles around the center point indicate sleeve 2 as a zone that is not technologically utilized by windings. This drawing represents a second technological version that shows how the two DC connectors for the outer current contacts are led out. An upper connection has a flat configuration in the form of a rectangle, having connector tab 5. The bottom connection has a similar appearance and lies below the level that is shown, with the associated connector tab 6. Connector tabs 5 and 6 are arranged at a distance from each other, to avoid arcing. This configuration also causes high inductance in high-power arrangements.

Referring to FIG. 1c, the individual capacitor turns (not shown) are drawn as winding 3. Sleeve 2, in the center of winding 3, having no winding turns, is again drawn with broken lines. The upper connection shows the connector contacting the thread of winding 3, ending in upper connector tab 5.

The second electrode is positioned as a lower connection in opposition to the upper connection. The lower connection ends in connector tab 6 are led to the upper level and are insulated on the outer mantle. This allows mounting in one level. Parasitic inductance is considerable in this configuration as well, and there is no minimum.

DE 42 32 763 C2 suggests the use of multilayer connector buses and describes their low-inductance positioning. In that solution, the starting point is the use of discretely arranged capacitors.

An even better defined position of the outer ports of discrete capacitors, related to the above, is described in DE 196 19 538 A1. Furthermore, to realize a converter arrangement with the lowest possible inductance, several suggestions are made for the circuitry of the DC-carrying circuit portions.

Special developments of capacitors, especially those with cavities, which are suitable for integrating the other converter components with low inductance, are suggested in DE 42 30 510 C1 and also in DE 44 43 498 C1.

The intermediate-circuit buses of converters are made according to the prior art in the form of sandwich buses (also called multilayer conductors) to keep the inductance as low as possible. However, for the sake of insulation, a considerable distance must be maintained between the connector points at every screw connection, which again leads to parasitic inductance.

In EP 0 476 297 A1, an electrolytic capacitor with reduced inductance is presented whose design maintains the proven capacitor windings, but the emergent connector tapelets are led from the winding with low inductance by means of a simply accomplished tilting fold.

More recent publications, too, for example in DE 195 10 624 C1, uses this known and proven connection sequence in their design.

OBJECTS AND SUMMARY OF THE INVENTION

It is an object of the present invention to provide a capacitor configured with low inductance.

It is a further object of the present invention to provide a capacitor which is integrated into an intermediate-circuit design of a converter, resulting in a compact and reliable configuration.

Briefly stated, the present invention provides a contact sleeve passing through a central region of a capacitor providing a low-inductance connection between a lower contact surface of a capacitor and a first outer port. The sleeve is separated from the windings of the capacitor by an insulative layer. A second outer port is formed in close proximity to and insulated from the first outer port so that arcing between the outer ports is prevented. The resulting capacitor has a low inductance and is useful in, for example, the intermediate circuit design of converters, resulting in a compact and reliable configuration.

According to an embodiment of the present invention, there is provided a capacitor comprising: a winding of dielectric and conductive materials; the winding having an first connector surface and a second connector surface; a sleeve within the winding extending from a first side of the capacitor to a second side of the capacitor; the sleeve being insulated from the winding; and a contact in the sleeve for electrically connecting the first connector surface on the first side of the capacitor with a first outer port on the second side of the capacitor.

According to a further embodiment of the present invention, there is provided a capacitor comprising: a winding of dielectric and conductive materials; the winding having an upper connector surface and a lower connector surface; a sleeve within the winding extending from a first side of the capacitor to a second side of the capacitor; the sleeve being formed in a cup surrounding the winding; an inner conical extension protruding into the sleeve; and a first outer port and a second outer port on a first surface of the capacitor.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 2*a* is a top view and a cross-sectional view of a winding of a capacitor according to the present invention.

FIG. 2*b* is a top view and a cross-sectional view of an insulating pressure-contact tab for a capacitor according to the present invention.

FIG. 2*c* is a top view and a cross-sectional view of an alternate layout for the connector tabs of the capacitor of the present invention.

FIG. 2*d* is a top view and a cross-sectional view of an alternate layout for the connector tabs of the capacitor of the present invention.

DETAILED DESCRIPTION OF THE INVENTION

Figure 1A:
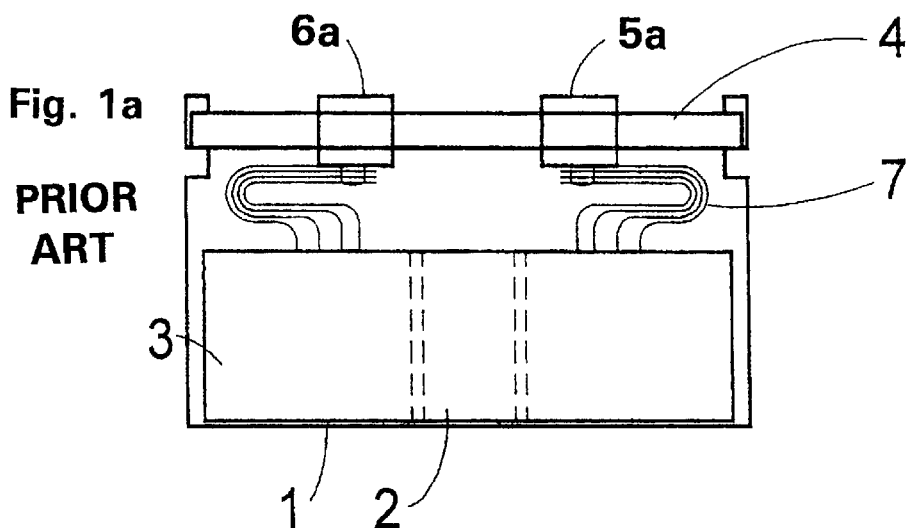
FIG. 1*a* shows an electrolytic capacitor according to the prior art.

Referring to FIG. 2*a*, the upper portion shows a top view of winding 3 of a capacitor of the present invention. A round tube 1 of winding 3 is drawn with broken lines. Sleeve 2, indicated by two broken lines, is without winding turns. Top connector tab 6 for the lower connection has a flat configuration, covering the entire tube 1. Top connector tab 6 can also represent a conductor bus of an intermediate circuit. At the edges of connector tab 6, an insulation layer 12 is shown with slightly larger outer dimensions.

The bottom part of FIG. 2*a* shows the cross section of the sketch shown on top. Central sleeve 2, being electrically insulated against windings 3, is used, by means of a conducting cylinder 8, providing electrical contact of the lower connection, which is designed as a plate. The coaxial connection of the capacitor thus formed electrically connects the underside of the capacitor, contacted over a large surface throughout the entire expansion of tube 1, with the associated connector tab 6 on the top of the capacitor.

Cylinder 8, within insulated central sleeve 2, is advantageously designed as a resilient element, providing electrical contact upward. Resilient cylinder 8 allows for reliable pressure-contacting between the lower connector plate and connector tab 6 which, in this embodiment as shown, is on top side. The two poles of the capacitor are electrically separated from each other by an insulation 9 of sleeve 2 and insulation 12 between two connector tabs 5 and 6, which are positioned in close proximity to each other.

The one-sided contacting of capacitors has the advantage that they can be placed onto cooling surfaces so as to fit closely. By placing shims of a flat design under them, it is possible to achieve a good heat transfer to cooling arrangements.

The further electrical linking to the intermediate-circuit bus depends on the configuration of the circuit arrangement to follow. Examples are shown for several possible systems in FIGS. 2*b* to 2*d*.

Figure 1B:
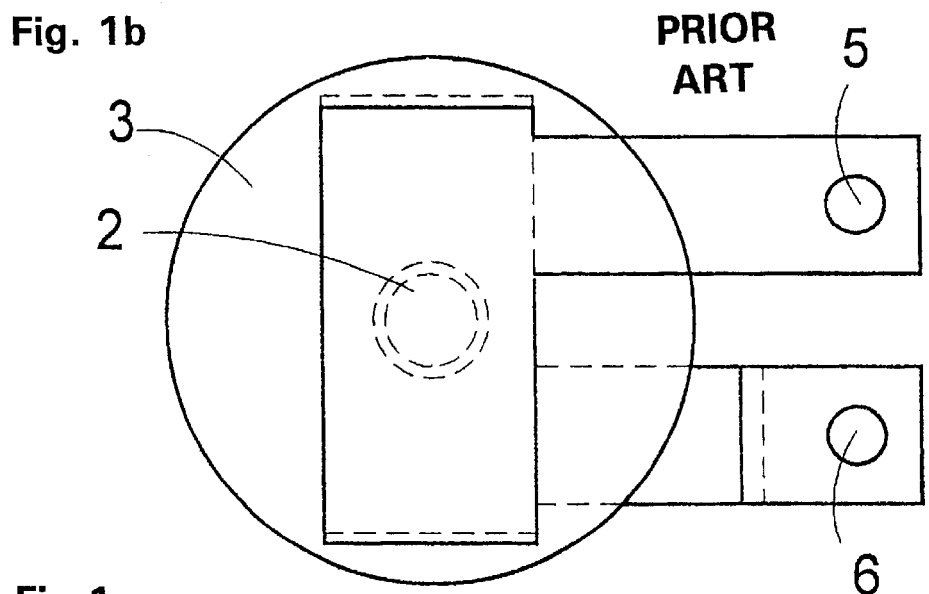
FIG. 1*b* shows a foil capacitor according to the prior art.
Figure 1C:
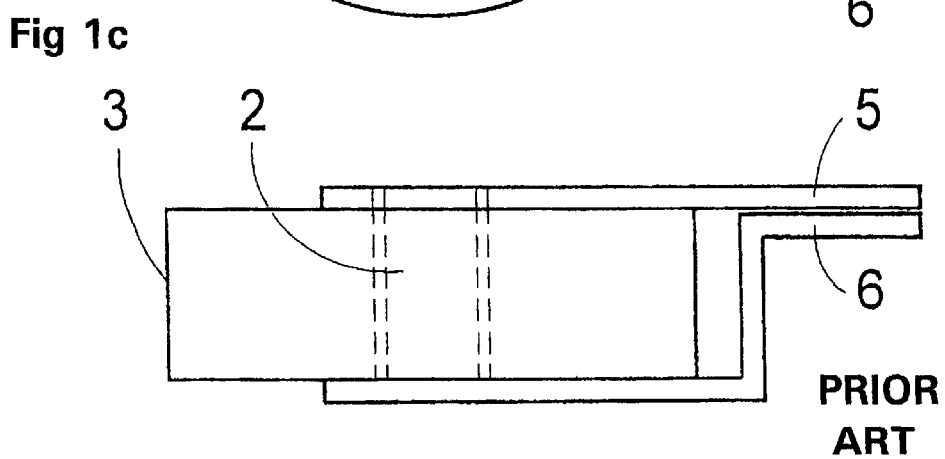
FIG. 1*c* shows a cross section of the foil capacitor according to the prior art of FIG. 1*b*.

Referring to FIG. 2*b*, an insulating pressure-contact tab 13 is included for a low-inductance connection between capacitor connector tabs 5 and 6 and the outer secondary ports, examples of which are shown in top view and in cross section as intermediate-circuit electrodes 10 and 11. For a low-inductance connection of capacitor and intermediate circuit, other prior-art solutions can be selected, as they are sketched, for example in FIGS. 1*a*–1*c*, representing DE 195 19 538 A1, herein incorporated by reference.

Referring to FIG. 2*c*, it is possible to form two connector tabs 5 and 6 from large-surface connector plates according to the present invention to facilitate the connection sequence that is still in common practice. In that case, however, the inductance values are expected to be higher than with a connection according to FIG. 2*b*.

Referring to FIG. 2*d*, the possibility of achieving angled connections directly between connector tabs 5 and 6 and intermediate-circuit electrodes 10 and 11 with insulation layer 12 is shown. By creating a closely adjacent position of the two capacitor connections, a low-inductance connection sequence is possible in the application.

Figure 3B:
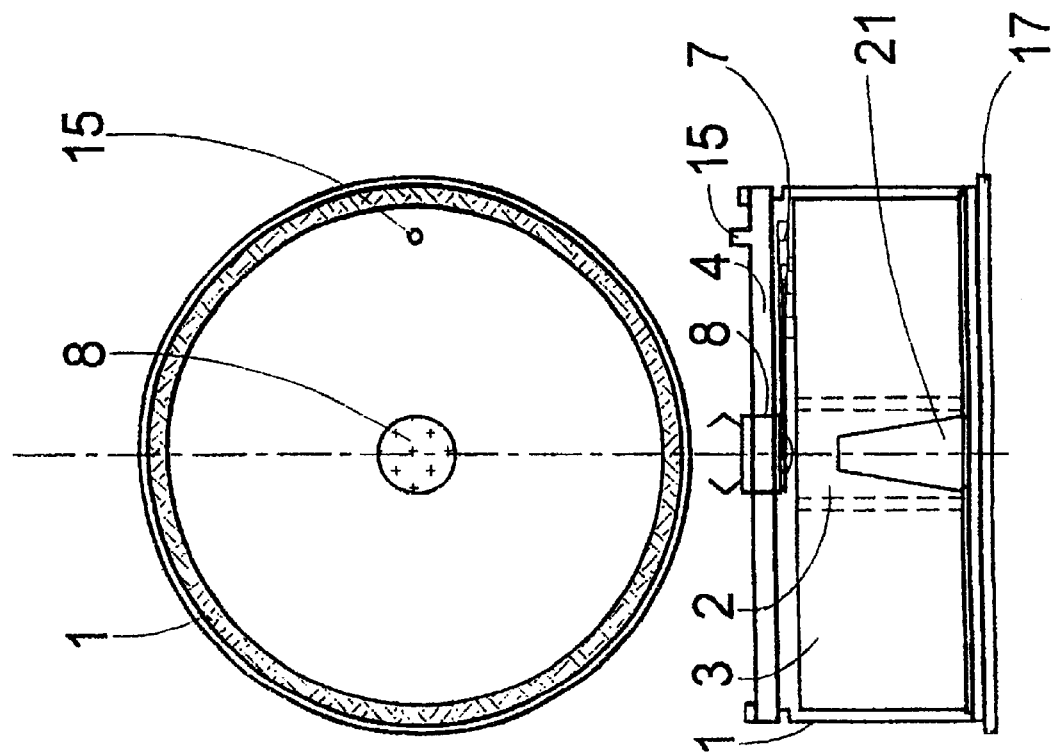
FIG. 3*b* is a top view and a cross-sectional view of an alternate configuration of a capacitor according to the present invention.
Figure 3A:
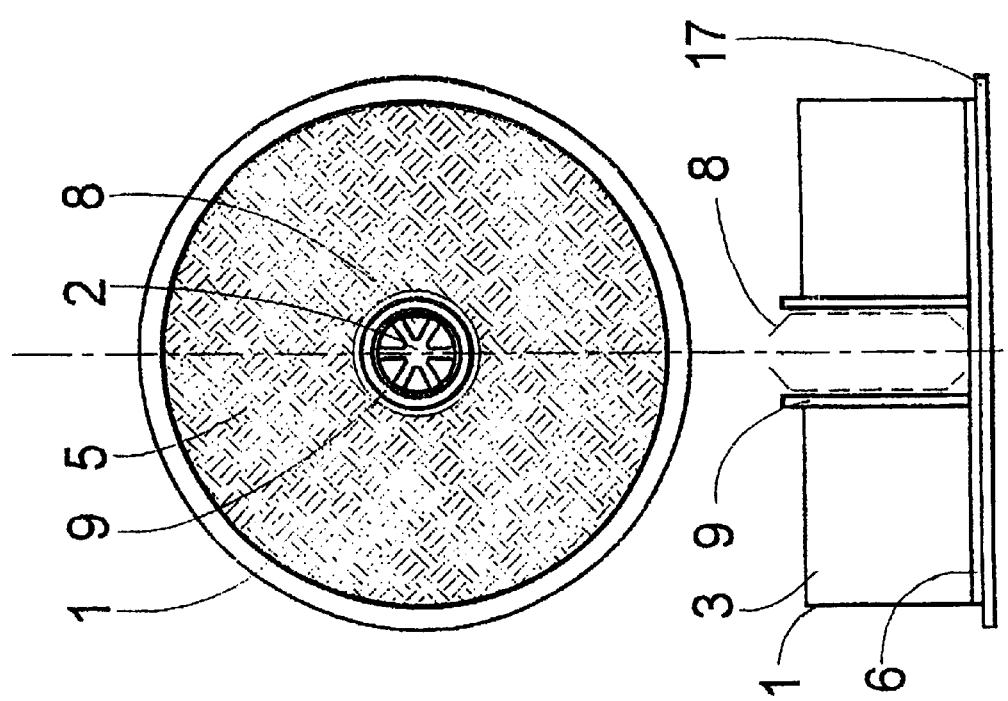
FIG. 3*a* is a top view and a cross-sectional view of a capacitor according to the present invention.

Referring now to FIG. 3*a*, the top part shows a top view of a foil capacitor, while the lower part shows the cross-section of the top view. The windings are of simple design without a cup 1, and the threads of top connector tab 5 can be seen. Sleeve 2 contains insulator 9 and the electrically conductive cylinder in the form of a spring 8, suitable as a pressure contact. By means of spring 8, an electrical connection is achieved between bottom connector tab 6 and the capacitor surface. This capacitor is built on a base plate 17 made of an electrically insulating material that is nevertheless a good heat conductor.

Referring to FIG. 3b, another possible version of the low-inductance configuration of an electrolytic capacitor is shown. Winding 3 is accommodated in a cup 1 made of an electrically conductive material. The center of winding 3 also forms sleeve 2. In the middle of cup 1 is a conical extension 21 of a size that accommodated in sleeve 2.

Connector tapelets 7, leading out of winding 3, are centrally connected with electrically conductive spring 8 in a manner according to the described prior art so that the outer electrical tap is possible with the known secondary ports. The heat outflow is also supported by base plate 17.

By means of a knob 15 worked into insulation plate 4 of the top cover, it is possible to electrically connect the electrolyte capacitor in a preferred direction with the bus of the intermediate circuit. This results in optimization of the connection of a low-inductance capacitor.

Figure 4:
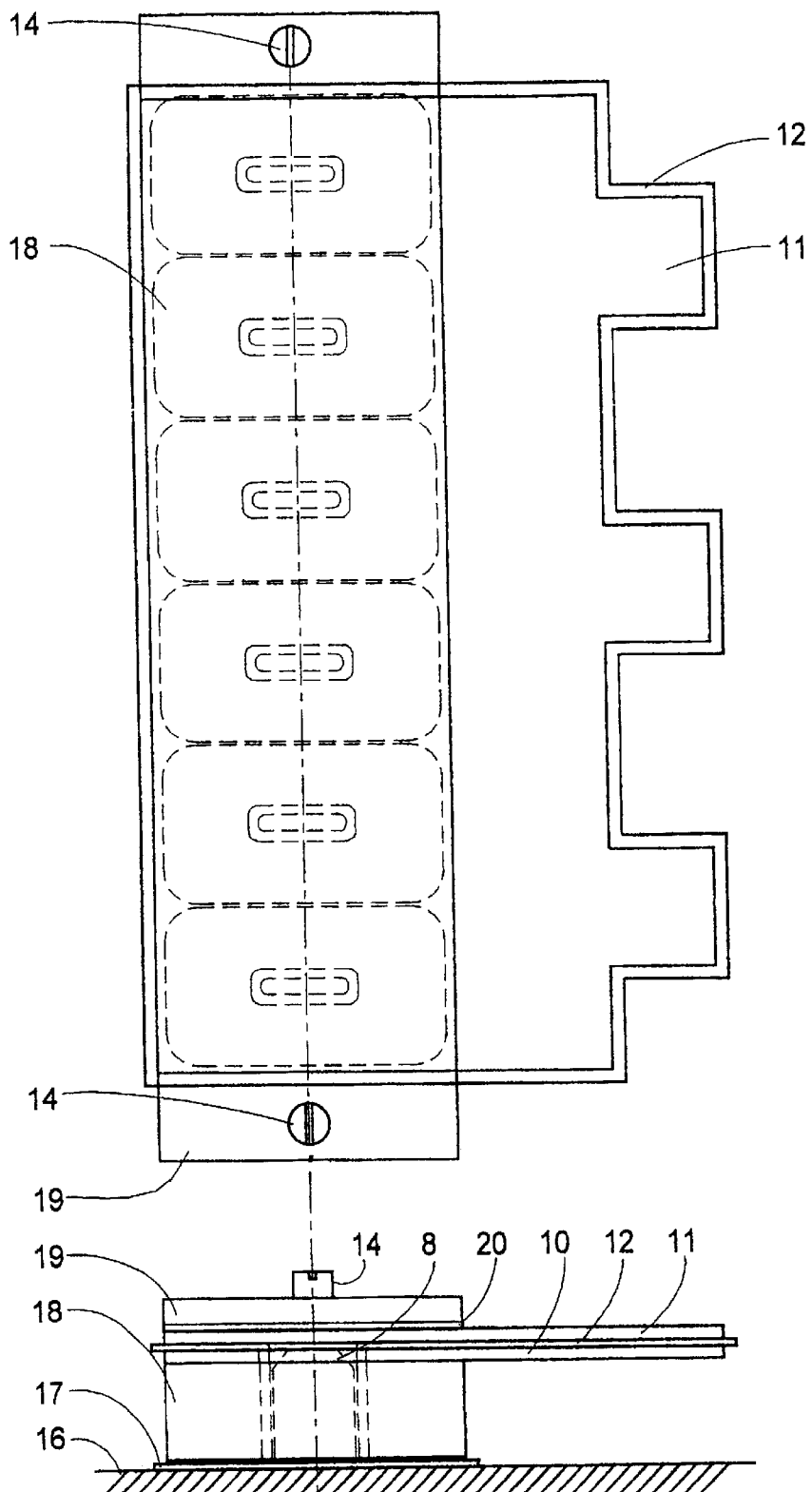
FIG. 4 is a top view and a cross-sectional view of the capacitors of the present invention connected in parallel.

Referring to FIG. 4, one version of an application of a capacitor according to the present invention is shown. In principle, the configuration according to FIGS. 2a–2d and 3a–3b can be used with capacitors 18 formed of flattened windings. The upper part of the drawing shows how six such capacitors 18 are connected in parallel. The intermediate-circuit segment (shown only in part) in the form of upper port electrode 11 and insulation layer 12 is sketched. The geometry of a bridge element 19, with a screw fitting 14 providing pressure, is indicated.

The lower part of the drawing shows a cross section of the configuration shown in the upper part. Electrical contacts as well as the thermal contact to a cooling body 16 is created through a pressure accumulator of a pressure spring system 20 when pressure is applied by means of screw fitting 14.

By means of an adapted design, an evenly distributed force is applied, via bridge element 19, clamped once or several times, to intermediate circuit 10, 11, and 12, and thus to all integrated capacitors 18. By means of screw fitting 14, all the lower capacitor ports arc contacted simultaneously via bridge element 19 through to electrically conductive springs 8.

Elastic insulation 12 serves as a power accumulator for the pressure system. Preferably, however, an additional pressure spring system 20 is also provided. To equalize the tolerance, the contact of electrically conductive spring 8 in sleeve 2 of capacitor 18 is of resilient design. This system, which is integrated with the rest of the circuit arrangement, is non-destructively disassembled by undoing screw fitting 14.

By using insulating material 17, which is nevertheless a good heat conductor between capacitor 18 and cooling body 16, a low thermal resistance is achieved. With intensive cooling of the intermediate-circuit capacitors, which is achieved in this same manner, the AC load is much higher than in an uncooled system. Therefore, an extremely compact design of high component density is achieved.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A capacitor comprising:

a winding of dielectric and conductive materials;

said winding having a first connector surface and a second connector surface on opposed surfaces of said winding;

a sleeve within said winding extending from said first connector surface to said second connector surface;

said sleeve being insulated from said winding;

a first outer port on a first side of said capacitor integral with said first connector surface;

a contact passing through said sleeve for electrically connecting said second connector surface, on a second opposite side of said capacitor, with a second outer port.

2. A capacitor according to claim 1, further comprising:

an insulation layer separating said second outer port from said first outer port.

3. A capacitor according to claim 2, wherein said first outer port is above and substantially parallel to said second outer port.

4. A capacitor according to claim 1, wherein said contact includes a resilient pressure contact.

5. A capacitor according to claim 1, wherein:

said first outer port and said second outer port are part of an intermediate circuit of a converter.

6. A capacitor according to claim 1, wherein:

said first outer port is in close proximity to and having electrical separation from said second outer port; and an insulation layer providing said electrical separation.

7. A capacitor according to claim 1, wherein said contact forms a coaxial configuration with said winding.

8. A capacitor according to claim 1, further comprising:

an insulating pressure contact tab;

said insulating pressure contact tab providing a low-inductance connection between said first outer port and a first outer secondary port and between said second outer port and a second outer secondary port.

9. A capacitor comprising:

a winding of dielectric and conductive materials;

said winding having a first connector surface and a second connector surface;

an insulating sleeve within said winding extending from said first connector surface to said second connector surface;

a cup surrounding said winding;

an inner conical extension protruding into said sleeve; and a first outer port and a second outer port on a surface of said capacitor.

10. A capacitor according to claim 9, further comprising an insulative plate on said surface of said capacitor.

11. A capacitor according to claim 9, wherein:

said first outer port and said second outer port are part of an intermediate circuit of a converter.

12. A capacitor according to claim 9, wherein:

said first outer port in close proximity to and having electrical separation from said second outer port; and an insulation layer providing said electrical separation.

13. A capacitor according to claim 10, further comprising:

a knob on said insulative plate; and said knob marking a low-inductance preferred direction of current flow, whereby integration of said capacitor into an intermediate circuit is accurately performed.

\* \* \* \* \*